US009873039B2

(12) United States Patent
Kim et al.

(10) Patent No.: US 9,873,039 B2
(45) Date of Patent: Jan. 23, 2018

(54) AUTOMATIC TRIGGER OF INTEGRATED GAME ACTIONS FOR EXERCISE AND WELL BEING

(71) Applicant: INTERNATIONAL BUSINESS MACHINES CORPORATION, Armonk, NY (US)

(72) Inventors: Minkyong Kim, Scarsdale, NY (US); Min Li, Blacksburg, VA (US); Clifford A. Pickover, Yorktown Heights, NY (US); Valentina Salapura, Chappaqua, NY (US)

(73) Assignee: International Business Machines Corporartion, Armonk, NY (US)

( * ) Notice: Subject to any disclaimer, the term of this patent is extended or adjusted under 35 U.S.C. 154(b) by 146 days.

(21) Appl. No.: 14/805,108

(22) Filed: Jul. 21, 2015

(65) Prior Publication Data
US 2017/0021279 A1    Jan. 26, 2017

(51) Int. Cl.
*A63F 13/10* (2006.01)
*A63F 13/00* (2014.01)

(52) U.S. Cl.
CPC .................................. *A63F 13/00* (2013.01)

(58) Field of Classification Search
CPC ................................ A63F 13/10; A63F 13/06
See application file for complete search history.

(56) References Cited

U.S. PATENT DOCUMENTS

| | | | |
|---|---|---|---|
| 4,925,189 A | 5/1990 | Braeunig | |
| 5,001,632 A * | 3/1991 | Hall-Tipping | A61B 5/02455 463/23 |
| 5,362,069 A | 11/1994 | Hall-Tipping | |
| 5,462,504 A * | 10/1995 | Trulaske | A61B 5/0002 482/54 |
| 8,454,437 B2 * | 6/2013 | Dugan | G06F 19/26 463/22 |
| 8,956,228 B2 | 2/2015 | Shum et al. | |
| 2005/0228692 A1 * | 10/2005 | Hodgdon | G06F 19/3431 705/2 |
| 2006/0229163 A1 * | 10/2006 | Waters | A63B 22/0605 482/8 |

(Continued)

FOREIGN PATENT DOCUMENTS

| | | |
|---|---|---|
| WO | 1996/005766 A1 | 2/1996 |
| WO | 2011020135 A1 | 2/2011 |

OTHER PUBLICATIONS

Boot et al., Do action video games improve perception and cognition?, Frontiers in Psychology, Perspective Article, Sep. 13, 2011, pp. 1-6, vol. 2, Art. 226.

(Continued)

*Primary Examiner* — Omkar Deodhar
(74) *Attorney, Agent, or Firm* — Tutunjian & Bitetto, P.C.; Yeen C. Tham

(57) ABSTRACT

Methods and systems for triggering integrated game actions include monitoring a user's state during operation a video game with one or more user state sensors. It is determined whether the user's level of activity is below a predetermined activity threshold based on the monitored state considered over a period of time. If the user's level of activity is below the predetermined activity threshold, a game sequence in the video game is triggered that involves physical activity on the part of the user.

20 Claims, 3 Drawing Sheets

(56) References Cited

U.S. PATENT DOCUMENTS

2010/0137105 A1    6/2010   McLaughlin
2011/0086747 A1    4/2011   Broderick

OTHER PUBLICATIONS

Zapirain et al., ICTs for Health and Wellbeing: Principles and Practice, OMICS Group eBooks, Feb. 2014, pp. 1-11.
Sharek et al., Measuring Video Game Engagement Through the Cognitive and Affective Dimensions, Sage Journals, Simulation & Gaming, Nov. 4, 2014, pp. 1, sag.sagepub.com, 1046878114554176.

* cited by examiner

AUTOMATIC TRIGGER OF INTEGRATED GAME ACTIONS FOR EXERCISE AND WELL BEING

BACKGROUND

Technical Field

The present invention relates to exercise gaming and, more particularly, to automatically triggering in-game actions based on biometric information.

Description of the Related Art

Obesity is a significant health threat in the United States and around the world. Nearly 78 million adults and 13 million children deal with the health and emotional effects of obesity. One tool for combatting obesity is exergaming (a portmanteau of "exercise" and "gaming"), which refers to video games that incorporate forms of exercise. Exergaming relies on technology that tracks body movement or reaction.

However, despite the availability of exergaming, many games either do not incorporate such features or do so in a manner that is poorly suited to effective exercise. Furthermore, existing systems lack the ability to respond directly to a user's physical, emotional, or mental states.

SUMMARY

A method for triggering integrated game actions includes monitoring a user's state during operation a video game with one or more user state sensors. It is determined whether the user's level of activity is below a predetermined activity threshold based on the monitored state considered over a period of time. If the user's level of activity is below the predetermined activity threshold, a game sequence in the video game is triggered that involves physical activity on the part of the user.

A method for triggering integrated game actions includes monitoring a user's state during operation a video game with one or more user state sensors. It is determined whether the user's level of activity is below a predetermined low activity threshold based on the monitored state. If the user's level of activity is below the predetermined low activity threshold for a predetermined period of time, a game sequence in the video game is triggered that involves physical activity on the part of the user and a difficulty of the game sequence is set in accordance with the user's level of fitness. The user's state is monitored during the game sequence. The level of difficulty is adjusted after triggering the game sequence based on the user's monitored state during the game sequence.

A system for triggering integrated game actions includes one or more user state sensors configured to monitor a user's state during operation of a video game. A game action control system includes a processor configured to determine whether the user's level of activity is below a predetermined activity threshold based on the monitored state considered over a period of time and, if the user's level of activity is below the predetermined activity threshold, to trigger a game sequence in the video game that involves physical activity on the part of the user.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide the ability to detect a user's physical, mental, and/or emotional states and to trigger integrated game actions that encourage physical activity based on those detected states. The integrated game action is designed to seamlessly integrate with the game experience, so that it does not feel out of place to the user. In this way, the present embodiments provide adaptive responses to the users' needs, even if the users do not recognize those needs themselves.

Figure 1:
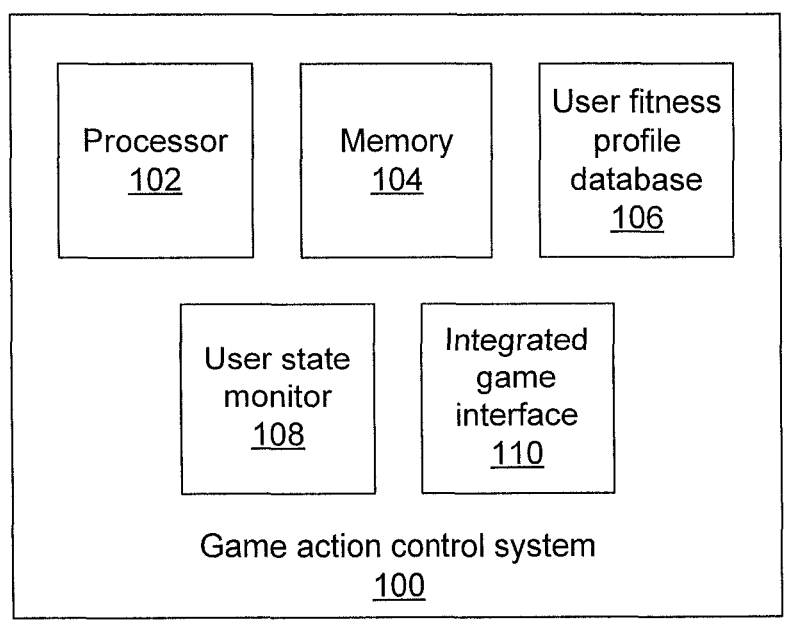
FIG. 1 is a block diagram of a game action control system in accordance with the present principles.

Referring now to the drawings in which like numerals represent the same or similar elements and initially to FIG. 1, a system 100 for controlling game actions is shown. A user fitness profile database 106 is stored in a memory 104 to store user fitness and health information. This database 106 may be used to suggest game sequences that are best suited to the user's particular fitness needs. For example, if the user has knee pain, this fact would be stored in the database 106 and could be used to select game sequences that will avoid provoking further knee injuries or which may even provide therapeutic benefits. A user state monitor 108 monitors the user's current physical and cognitive state. The user's physical state may include a level of activity (measured by, e.g., the user's heart rate) or mental state (e.g., anxiety, drowsiness, etc.) and may be performed by one or more sensors that may include accelerometers, biometric sensors, biofeedback sensors, brainwave sensors, heart rate monitors, etc. The user state monitor 108 can be integrated with a controller for a video game system, such that the user need not use a separate peripheral device.

Measurement of a user's cognitive state may come in two forms: static and dynamic (e.g., real time). In the static case, game users may fall into a variety of demographics, from young to old, from sick to healthy. A user may have certain dispositions, tendencies, behaviors, and conditions. For example, a child with autism may have different needs and tendencies to exercise in response to different pieces of integrated game content for aiding physical and mental activity. For example, a person who can focus strongly or needs to increase cognitive "tone" may find it useful to have the integrated game content be a combination of physical activity and mental activity (e.g., jumping on red rocks, but not green rocks). Meanwhile, a person with anger control difficulties may benefit from game content that is temporarily less violent in content but still conducive to exercise. This sort of static cognitive state may be supplied as a profile by a user, parent, teacher, or caregiver, or may be inferred by unobtrusive tests of attention deficit, movement disorders, tremor measures, etc. Some may enjoy repetitive content for physical and mental activity, whereas others may not. Others may benefit from integrated game content involving an action scene, whereas such a scene may not be beneficial to fearful children or people with particular sensitivities.

In the case of dynamic cognitive state, a user may be alert or tired at any given moment, as measured by decreasing mental or manual dexterity. The integrated game content may be more beneficial if dynamic state is taken into account. For example, if the user appears to be tired, overly demanding integrated game content may be less tolerated or effective. On the other hand, the integrated game content may offer a sudden "wakeup" stimulus. One way to measure dynamic cognitive state is to monitor brain activity indicative of mental tension, distraction, fatigue, etc.

Based on the information provided by the user state monitor 108 and the information stored in the fitness profile database 106, the integrated game interface 110 makes a determination using a hardware processor 102 as to whether to trigger a game action. This game action is intended to create or ameliorate some health effect within the user. Such game actions may include scenarios that require a user to stand up, take steps, jump, gesture at a screen, relax the eyes, take breaths, etc. Along with prompting the activity, the integrated game interface 110 also cues a piece of game content that fits into the flow of the game itself, such that the activity is presented in a seamless, unobtrusive manner. In one specific example, if the user wishes to cross a stream in the game, the user may be required to stand up and hop across stones in the video game by making jumping motions in the real world.

The integrated game interface 110 furthermore adjusts a difficulty level of the triggered action, where the adjustment may include changing a level of intensity or a type of physical activity, responsive to the level of the game that the user is playing. This difficulty level can also be adjusted based on how successfully the user has completed physical activities in the past. This feedback allows the system 100 to learn appropriate activities for the given user, storing said results in the fitness profile database 106. Whereas some children may enjoy being challenged to do a handstand, other children may not be physically ready to perform such a feat. Different physical activities are selected based on user profile information, which may include user age and physical capability (influenced by health conditions such as a recent surgery) so that the selected exercise level is appropriate for the user.

Similarly, if there are fight scenes, or other related activities in three-dimensional games, the degree to which the game demands physical movement in the real world may be adapted based on the aforementioned triggers, such as a trigger based on a period of physical activity prior to the in-game encounter. In one example, if a game includes a swordfight, the extension of limbs, in both the real world and virtual world, may have a more arduous requirement, or the motions may be as if there were a degree of viscosity or slowing force that must be overcome to complete the in-game action.

Similarly, an additional adversary that involves physical movement in the real world to overcome (e.g., a sword fight using a motion sensor and real arm motions) may be introduced based on a trigger, such as a period of physical inactivity in the real world. Not only will this encourage more activity during the encounter with the adversary, it may encourage users to move during the game so as to avoid such an adversary encounter or to lessen the difficulty of the encounter.

The integrated game interface 110 may be used to insert integrated content in a natural or useful way, and the interface 110 may be controlled by input from a game maker, third party, parent, healthcare professional, etc., in accordance with direct instructions or configuration options stored in the memory 104. The interface 110 may furthermore be run as a trans-vendor service, so that more than one party may contribute to it.

The triggered game sequences added by the integrated game interface 110 may be introduced in a manner similar to that by which advertisements are added to videos or mobile applications. In particular, for games, the developer can add a placeholder in the game's storyline, so that special sequences can be triggered if a condition (such as, in this case, a low level of physical activity in the user) is met.

Optionally, more sophisticated arrangements can be made for using a video game controller that attaches to the user's upper body allowing the user to play a video game by leaning the upper body in any direction, simulating the movement of a joystick. The controller attaches to the user's upper back with an arrangement of straps and buckles. The tilt of the user's upper body is detected by an array of mercury switches with the resultant electrical signals being transmitted to the input of a video game. The specific angle of tilt required to actuate the mercury switches can be adjustable, thereby varying the degree of upper body movement needed to play a particular video game. Additional controls for the video game, such as a firing control, are provided by a hand held pushbutton attached to the controller via a flexible cord. Playing a video game using this arrangement results in vigorous exercise of the abdominal, back and lateral muscles. Such a video game controller can double as an input for the video game system and the user state monitor 108.

Other sensors that may be employed include a hand activity sensor for providing a signal associated with the independent and unconstrained movement of each of a user's hands for determining at least one aspect of an interactive video game. A foot activity sensor apparatus may provide a signal associated with an activity executed by the user's feet, while a torso activity sensor may provide a signal associated with an activity executed by the user's torso for determining an aspect within the interactive video game. A further sensor may include a device attached to a joystick control, where the user is positioned to perform push-up and squat exercises. Movements of user's torso down, up, forward, back, and side-to-side generate traditional control commands, including roll, pitch, and yaw. Downward motion and/or pressure by the user triggers a switch. The device collects the motion and trigger data and transmits control information via an electronic link to a computer or video game system for processing. Hence, the user receives the benefit of a serious exercise program while playing games, thereby making the exercise fun.

Figure 2:
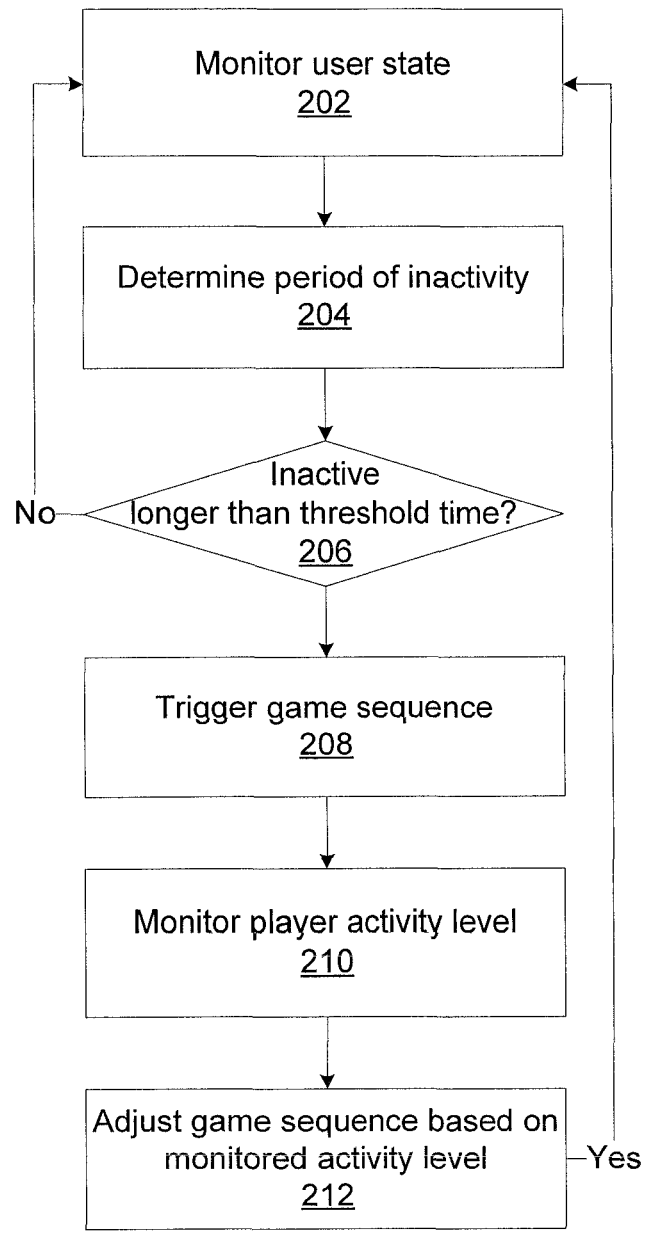
FIG. 2 is a block/flow diagram of a method for game action control in accordance with the present principles.

Referring now to FIG. 2, a method for triggering integrated game actions is shown. Block 202 monitors the user's physical state using, e.g., user state monitor 108. Block 204 tracks the user's physical state over time and determines, e.g., a period of inactivity. This inactivity may be judged according to one or more activity thresholds related to the user's physical state. For example, block 202 may track the user's heart rate, while block 204 will judge a heart rate below some threshold value to represent inactivity. This determination can be made in accordance with the user's fitness profile database 106, as different users will have different resting measurements and different active measurements. As such, a user having a particularly high resting heart rate may have a different threshold for the purpose of determining activity than a user with a relatively low resting heart rate.

Block 206 determines whether the period of inactivity exceeds a time threshold. If the user has been inactive for too long, processing advances to block 208 where an exercise game sequence is triggered. Otherwise, processing returns to block 202 for further monitoring of the user's state. Block 208 uses the integrated game interface 110 to trigger the game sequence, initiating within a video game system a sequence that involves the user's physical activity. For each game, and for each point within the game, there can be more than one appropriate game sequence available to block 208. Which game sequence to trigger may be determined by the user's fitness profile database 106 and may depend on the user's level of physical fitness. For example, stones that a user needs to jump across can appear farther away, motivating the user to make larger jumps.

Block 210 monitors the user's physical activity during the sequence, ensuring that the user's level of activity meets predetermined goals. For example, a goal may include elevating the user's heart rate above a certain threshold level for a certain period of time. Block 210 may be implemented using separate user state sensors or may be implemented using the game controller itself. For example, if the game sequence tasks the user with running in place, a motion sensor may be configured to sense the user's speed and detect if the user starts to slow down. Block 212 adjusts the game sequence based on the monitored activity level. This may include increasing a difficulty level if the user's activity level is not meeting the predetermined goals or may also include decreasing the difficulty level if the user is struggling or is experiencing distress. Following the above example of a user running in place, block 210 may detect that the user is not able to keep the pace set by the game sequence, which may cause the user to give up. To compensate, block 212 may lower the speed needed to complete the sequence while achieving activity goals. Thus if, e.g., the user's heart rate is within a range needed to meet the user's fitness goals, the game may be made easier to keep the user engaged while still meeting those goals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The integrated game interface 110 in particular may be implemented by "middleware" of the system 100 and various underlying layers. The insertion of integrated game content may be facilitated by game console makers via, e.g., libraries and application programming interfaces (APIs) for game makers and third parties to use.

Figure 3:
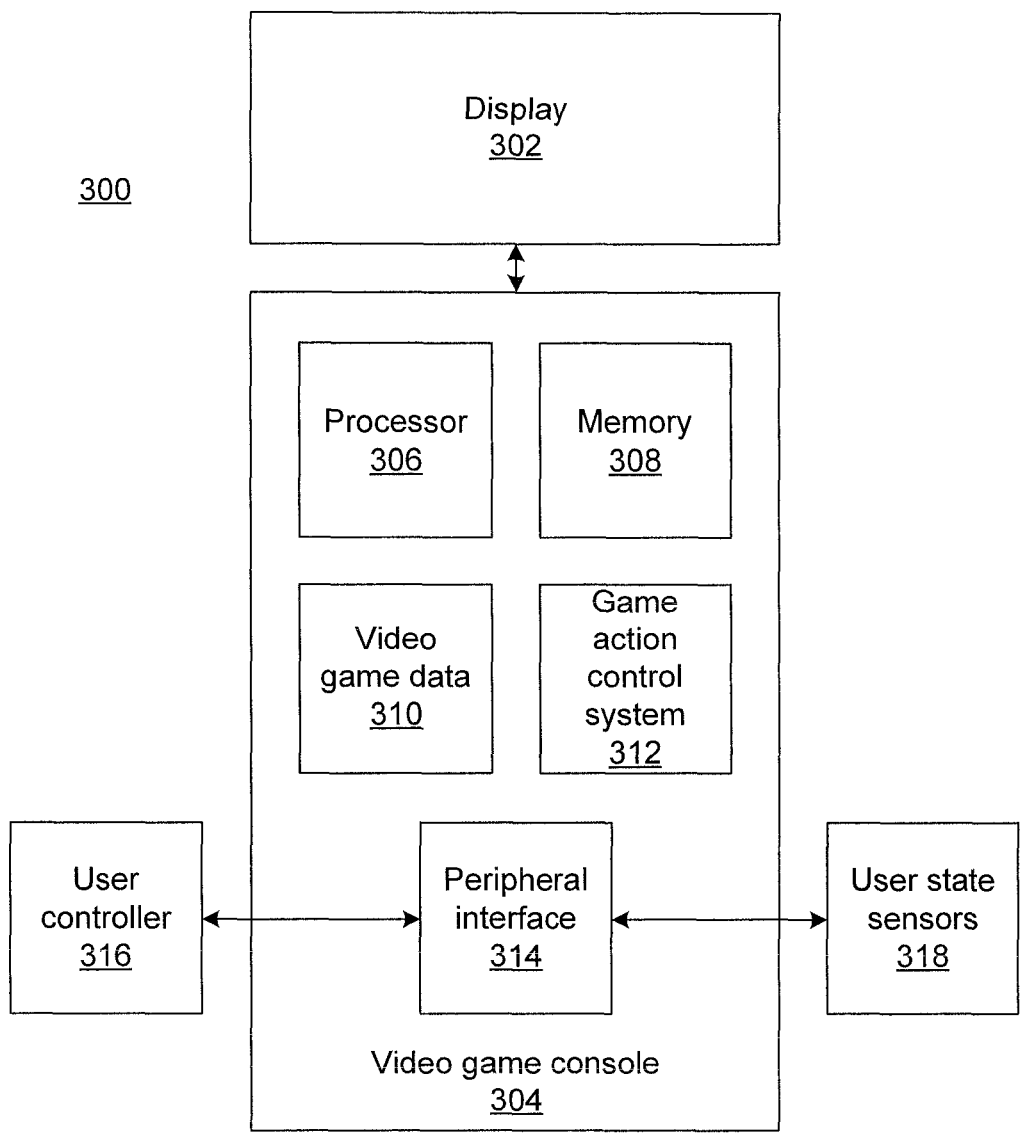
FIG. 3 is a block diagram of a game system in accordance with the present principles.

Referring now to FIG. 3, a video game system 300 is shown. The video game system 300 includes a display 302 and a video game console 304. The display 302 may be a conventional video display including, for example, a cathode ray tube or a flat-screen display such as a liquid crystal display, a plasma display, a light emanating diode (LED) display, or an organic LED display. The display 302 may alternatively be a wearable display device such as a head-mounted screen or a virtual reality headset. The visual information displayed on the display 302 is controlled by a video game console 304. The video game console 304 may include a dedicated set-top box or may instead be a personal computer.

The video game console 304 includes a hardware processor 306 and a memory 308, which may include local storage such as a hard disk drive or flash and may also include removable storage such as, for example, a digital versatile disc (DVD) or Blu-ray Disc™. Video game data 310 is stored on the memory 308 and is executed by the processor 306 to run an interactive game that is displayed on display 302 using appropriate video display hardware. The video game console 304 also includes a game action control system 312. It should be noted that the game action control system 312 may be implemented within the video game console 304 as discrete hardware or integrated software or may be implemented as a separate device, as shown in FIG. 1. In the context of FIG. 3, the game action control system 312 may employ the processor 306 and memory 308 of the video game console 304 to perform the above-described functions.

The video game console 304 further includes a peripheral interface 314 that interfaces with external devices. In particular, it is contemplated that the peripheral interface may communicate with a user controller 316 and user state sensors 318. The user controller 316 provides an interface by which the user may control the video game console 304 and interact with the video game. The user state sensors 318 provide information regarding the user's cognitive and physical state that the game action control system 312 can use to monitor the user's state. It is contemplated that the user state sensors 318 may be implemented as one or more component within the user controller 316 or may be an entirely separate device.

Having described preferred embodiments of an automatic trigger of integrated game actions for exercise and well being (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for triggering integrated game actions, comprising:
    monitoring a user's state during operation of a video game with one or more user state sensors;
    determining whether the user's level of activity is below a predetermined activity threshold based on the monitored state considered over a period of time as well as past physical and mental conditions; and
    if the user's level of activity is below the predetermined activity threshold, triggering a game sequence in the video game that involves changing a type of physical activity on the part of the user.

2. The method of claim 1, wherein triggering the game sequence comprises setting a difficulty level of the game sequence in accordance with the user's level of fitness.

3. The method of claim 2, further comprising determining the user's level of fitness based on historical activity data.

4. The method of claim 2, further comprising determining the user's level of fitness based on a medical history profile.

5. The method of claim 2, further comprising adjusting the level of difficulty after triggering the game sequence based on monitoring the user's state during the game sequence.

6. The method of claim 5, wherein adjusting the level of difficulty after triggering the game sequence comprises lowering the difficulty level if the user is performing below a level needed to complete the sequence but within a goal range of the user's monitored state.

7. The method of claim 1, wherein the predetermined activity threshold is a length of time for which the user's state has remained below a predetermined low-activity threshold.

8. The method of claim 1, wherein content of the game sequence is determined in accordance with the user's level of fitness.

9. A computer readable storage medium comprising a computer readable program for triggering integrated game actions, wherein the computer readable program when executed on a computer causes the computer to perform the steps of claim 1.

10. A method for triggering integrated game actions, comprising:
   monitoring a user's state during operation of a video game with one or more user state sensors;
   determining whether the user's level of activity is below a predetermined low activity threshold based on the monitored state time as well as past physical and mental conditions;
   if the user's level of activity is below the predetermined low activity threshold for a predetermined period of time, triggering a game sequence in the video game that involves changing a type of physical activity on the part of the user and setting a difficulty of the game sequence in accordance with the user's level of fitness;
   monitoring the user's state during the game sequence; and
   adjusting the level of difficulty after triggering the game sequence based on the user's monitored state during the game sequence.

11. A system for triggering integrated game actions, comprising:
   one or more user state sensors configured to monitor a user's state during operation of a video game;
   a game action control system comprising a processor configured to determine whether the user's level of activity is below a predetermined activity threshold based on the monitored state considered over a period of time as well as past physical and mental conditions and, if the user's level of activity is below the predetermined activity threshold, to trigger a game sequence in the video game that involves changing a type of physical activity on the part of the user.

12. The system of claim 11, wherein the game action control system is further configured to set a difficulty level of the game sequence in accordance with the user's level of fitness.

13. The system of claim 12, wherein the game action control system is further configured to determine the user's level of fitness based on historical activity data.

14. The system of claim 12, wherein the game action control system is further configured to determine the user's level of fitness based on a medical history profile.

15. The system of claim 12, wherein the one or more user state sensors are configured to monitor the user's state during the game sequence; and
   wherein the game action control system is further configured to adjust the level of difficulty after triggering the game sequence based on the user's monitored state during the game sequence.

16. The system of claim 15, wherein the game action control system is further configured to lower the difficulty level if the user is performing below a level needed to complete the sequence but within a goal range of the user's monitored state.

17. The system of claim 11, wherein the predetermined activity threshold is a length of time for which the user's state has remained below a predetermined low-activity threshold.

18. The system of claim 11, wherein content of the game sequence is determined in accordance with the user's level of fitness.

19. The method of claim 1, wherein the types of physical activity include calisthenics types of physical activity.

20. The system of claim 11, wherein the types of physical activity include calisthenics types of physical activity.

* * * * *

UNITED STATES PATENT AND TRADEMARK OFFICE
CERTIFICATE OF CORRECTION

| | | |
|---|---|---|
| PATENT NO. | : 9,873,039 B2 | Page 1 of 1 |
| APPLICATION NO. | : 14/805108 | |
| DATED | : January 23, 2018 | |
| INVENTOR(S) | : Minkyong Kim et al. | |

It is certified that error appears in the above-identified patent and that said Letters Patent is hereby corrected as shown below:

On the Title Page

Item (73) Assignee: DELETE "Corporartion" and INSERT --Corporation--

Signed and Sealed this
Fifteenth Day of November, 2022

Katherine Kelly Vidal
*Director of the United States Patent and Trademark Office*